United States Patent
Perlow

(10) Patent No.: US 6,351,293 B1
(45) Date of Patent: Feb. 26, 2002

(54) DECISION DIRECTED PHASE DETECTOR

(75) Inventor: Randall Bret Perlow, Washington Crossing, PA (US)

(73) Assignees: Sarnoff Corporation, Princeton, NJ (US); Motorola Inc., Schaumburg, IL (US)

(*) Notice: Subject to any disclaimer, the term of this patent is extended or adjusted under 35 U.S.C. 154(b) by 0 days.

(21) Appl. No.: 09/114,310

(22) Filed: Jul. 13, 1998

Related U.S. Application Data

(60) Provisional application No. 60/085,864, filed on May 18, 1998.

(51) Int. Cl.$^7$ .......................... H04N 7/12; H04N 5/455; H04N 11/02; H04N 11/04
(52) U.S. Cl. .................. 348/726; 348/536; 455/204
(58) Field of Search .......................... 348/432.1, 433.1, 348/436.1, 536, 539, 549, 726, 727; 375/321, 346; 455/204; H04N 7/12, 5/455, 11/02, 11/04

(56) References Cited

U.S. PATENT DOCUMENTS

| | | | |
|---|---|---|---|
| 5,128,966 A | 7/1992 | Bang | 375/82 |
| 5,471,508 A | 11/1995 | Koslov | 375/344 |
| 5,533,070 A | 7/1996 | Krishnamurthy et al. | 376/96 |
| 5,588,025 A | 12/1996 | Strolle et al. | 375/316 |
| 5,602,601 A * | 2/1997 | Kim et al. | 348/726 |
| 5,673,293 A * | 9/1997 | Scarpa et al. | 375/321 |
| 5,692,013 A * | 11/1997 | Koslov et al. | 375/277 |
| 5,706,057 A | 1/1998 | Strolle et al. | 348/426 |
| 5,796,786 A * | 8/1998 | Lee | 375/326 |
| 5,799,037 A | 8/1998 | Strolle et al. | 375/233 |
| 5,805,242 A | 9/1998 | Strolle et al. | 348/726 |
| 5,835,532 A * | 11/1998 | Strolle et al. | 375/233 |
| 5,872,815 A | 2/1999 | Strolle et al. | 375/321 |
| 5,894,334 A | 4/1999 | Strolle et al. | 348/725 |
| 5,933,460 A * | 8/1999 | Lee | 375/324 |
| 5,943,369 A * | 8/1999 | Knutson et al. | 375/326 |
| 6,005,640 A * | 12/1999 | Strolle et al. | 348/726 |
| 6,148,037 A * | 11/2000 | Abe | 375/321 |

FOREIGN PATENT DOCUMENTS

WO     WO95/26105     9/1995

OTHER PUBLICATIONS

W. Lee, K. Cheun, S. Choi, "A Hardware Efficient Phase/Gain Tracking Loop for the Grand Alliance VSB HDTV Receiver", IEEE Transactions on Consumer Electronics, vol. 42, No. 3, Aug. 1996, pp. 632–639.

International Search Report concerning PCT/US99/10825; our reference SAR 12881 PCT; filing date May 18, 1999.

* cited by examiner

Primary Examiner—Reinhard J. Eisenzopf
Assistant Examiner—Brian P. Yenke
(74) Attorney, Agent, or Firm—William J. Burke

(57) ABSTRACT

A decision directed phase detector that uses the quantized data output from a slicer to aid the phase error detection process to determine a phase error of a complex signal such as a vestigial sideband (VSB) signal containing in phase (I) and quadrature phase (Q) components (I and Q signals). The phase detector comprises subtractor having one input coupled to the I signal and a second input coupled to the data output of the slicer representing the magnitude of a sample point within a symbol. The quantized signal is subtracted from the I signal to produce ΔI signal. The Q signal is processed to determine its sign and magnitude. The sign and magnitude values are multiplied together and the result is multiplied with the ΔI signal to produce the phase error between the I and Q signals. This phase error signal is used in a digital television receiver to extract a data signal from a VSB signal for demodulation.

11 Claims, 2 Drawing Sheets

US 6,351,293 B1

DECISION DIRECTED PHASE DETECTOR

This patent application claims benefit of U.S. provisional patent application Ser. No. 60/085,864, filed May 18, 1998 the disclosure of which is incorporated herein by reference.

The invention generally relates to digital television signal receivers and, more particularly, the invention relates to a phase detector for a vestigial sideband (VSB) signal receiver.

BACKGROUND OF THE DISCLOSURE

To accurately extract data from a vestigial sideband (VSB) signal as used, for example, in a high definition television (HDTV) transmission system, the phase error of the VSB signal with respect to the phase of the sampling signal for the quantizer (slicer) must be detected and tracked. FIG. 1 depicts a block diagram of a conventional phase tracking loop 100 for a digital television receiver. This conventional loop is defined in the "Guide To The Use Of The ATSC Digital Television Standard" Document A/54, Advanced Television Systems Committee, Apr. 12, 1995. The standard suggests using a phase tracking loop that operates only upon a real signal (e.g., the in-phase signal). As such, to determine a phase error of the VSB signal, the quadrature phase (Q) signal is derived from the I signal. Because the I and Q components of a VSB signal are related by a filter function that is approximately a Hilbert transform, a filter 104 is used to derive a Q signal from the I signal. The filter is a finite impulse response (FIR) filter having fixed anti-symmetric coefficients and with every other coefficient equal to zero. The I signal is delayed in delay 102 for a period equal to the length of the filter 104.

To compensate for the phase error, the I and Q signals are coupled to a complex multiplier 106 that is driven by an oscillator (e.g., a numerically controlled oscillator (NCO)) 112 that is, in turn, controlled by an error signal from a phase detector 108. The phase of the NCO output signal is modulated to correct the phase error and produce phase adjusted I and Q signals (I' and Q'). The phase detector 108 compares the I' signal to the derived Q' signal and produces a phase error detection signal (e) that represents the phase error of the VSB signal. A loop filter 110 (a low pass filter) is used to filter the higher order components from the error signal e. In effect, the combination of the oscillator signal and the I and Q input signals within the complex multiplier 102 creates derotated I and Q signals. The depicted circuit 100 is a closed loop phase tracking circuit that compensates for carrier phase error in the I and Q signals such that a relatively stable in-phase (I) signal is created that can be sampled within a demodulator to extract the data from the VSB signal. One example of a phase tracking circuit that uses a derived Q component is described by Lee et al. in "A Hardware Efficient Phase/Gain Tracking Loop For The Grand Alliance VSB HDTV Receiver," IEEE Trans. on Consumer Electronics, pp. 632–639, Vol. 42, No. 3, Aug. 1996.

Since the Q signal is derived from the I signal to synthesize a complex signal for phase tracking, the derived signal may not always accurately represent the Q signal, i.e., multipath and phase distortion may cause cross-coupling of the I and Q components of the VSB signal such that the derived Q signal misrepresents the actual Q component. When the Q signal is misrepresented, the phase tracking loop will produce an erroneous phase error that will cause the loop to distort the quantized I data. Consequently, the information carried by the I data may not be recoverable.

Therefore, a need exists in the art for a decision directed phase detector that compares the I and Q signals to produce a phase error and uses symbol decision information to enhance the accuracy of the phase error signal.

SUMMARY OF THE INVENTION

The disadvantages heretofore associated with the prior art are overcome by a decision directed phase detector that uses the data output from a slicer (quantizer) to aid the phase error detection process to determine a phase error of a complex signal such as a vestigial sideband VSB) signal containing in-phase (I) and quadrature phase (Q) components (I and Q signals). The phase detector comprises a subtractor having one input coupled to the I signal and a second input coupled to the data output of the slicer representing the magnitude of a sample point within a symbol. The quantized signal is subtracted from the I signal to produce ΔI signal. The Q signal is processed to determine its sign and magnitude. The sign and magnitude values are multiplied together and the result is multiplied with the ΔI signal to produce the phase error of the VSB signal. This phase error signal is used in a digital television receiver to extract a data signal from a VSB signal for demodulation.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
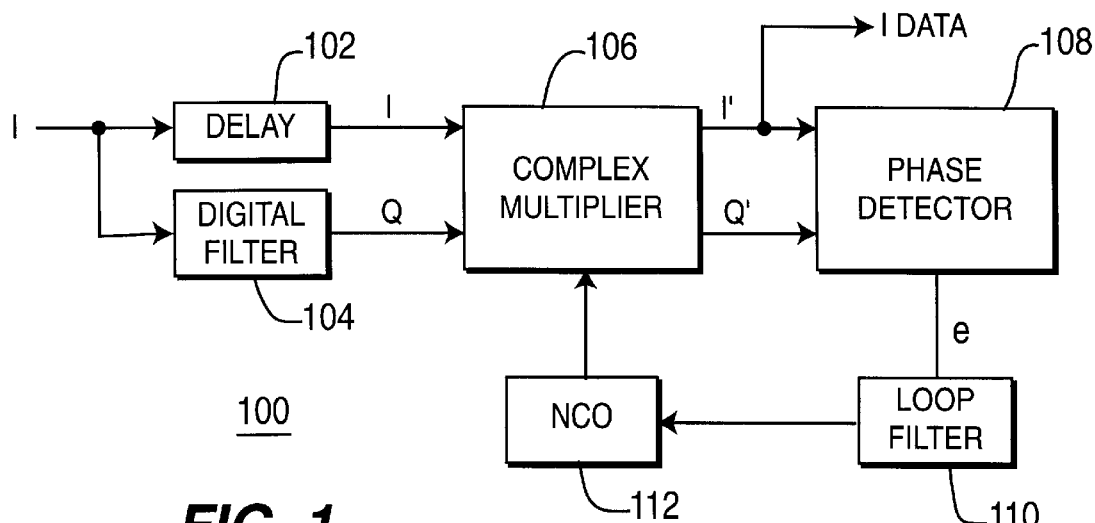
FIG. 1 depicts a block diagram of a prior art phase tracking loop for a digital television signal receiver.
Figure 2:
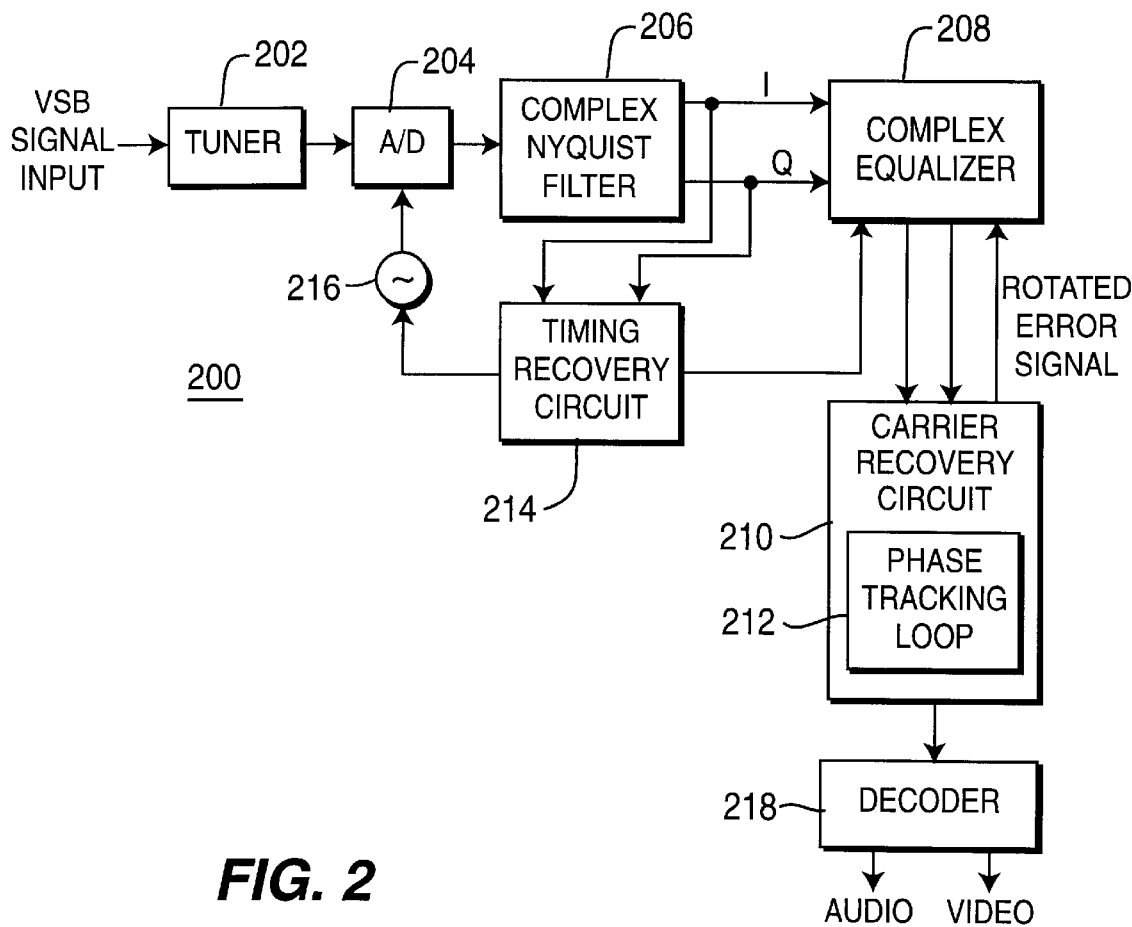
FIG. 2 depicts a block diagram of a digital television receiver for demodulating VSB signals using a decision directed phase detector of the present invention.

FIG. 2 depicts a simplified, high level block diagram of a vestigial sideband (VSB) signal receiver 200 of a type that is used in digital television receivers. The receiver 200 contains a tuner 202, an analog-to-digital (A/D) converter 204, an oscillator 216, a complex Nyquist filter 206, a complex equalizer 208, a timing recovery circuit 214, a carrier recovery circuit 210 and a decoder 218. A band of frequency containing VSB signals is coupled from an antenna or cable television system (not shown) to the tuner 202. The tuner selects a single VSB signal from the band and produces that VSB signal at a passband (e.g., IF) frequency. The passband VSB signal is converted to a passband digital signal by the A/D converter 204 such that the analog VSB signal is digitized generally by a sampling signal having a rate that is one to four times the VSB symbol rate. The sampling signal is produced by the oscillator 216. The digitized VSB signal is coupled to the complex Nyquist filter 206 which extracts an in phase (I) signal and a quadrature phase (Q) signal from the VSB signal.

The I and Q signals are coupled to both a complex equalizer 208 and a timing recovery circuit 214. The timing recovery circuit 214 recovers symbol timing information from the I and Q signals and provides a timing adjustment signal to the oscillator 216. As such, the symbols in the passband digital signal are optimally sampled by the A/D converter 202. The complex equalizer 208 is a passband equalizer that adaptively equalizes the I and Q signals to remove transmission channel distortion from the signals such that the signals can be demodulated with little intersymbol interference (ISI). The equalized I and Q signals are coupled to the carrier recovery circuit 210 that contains the phase tracking loop 212 of the present invention.

The carrier recovery circuit 210 determines the phase error of the I and Q signals to produce a rotated error signal that is used by the equalizer to minimize ISI and the rotated error signal. The I signal is coupled from the carrier recovery circuit 210 to the decoder 218 where the data is extracted from the I signal. The decoder 218 ultimately produces audio and video signals for display.

Figure 3:
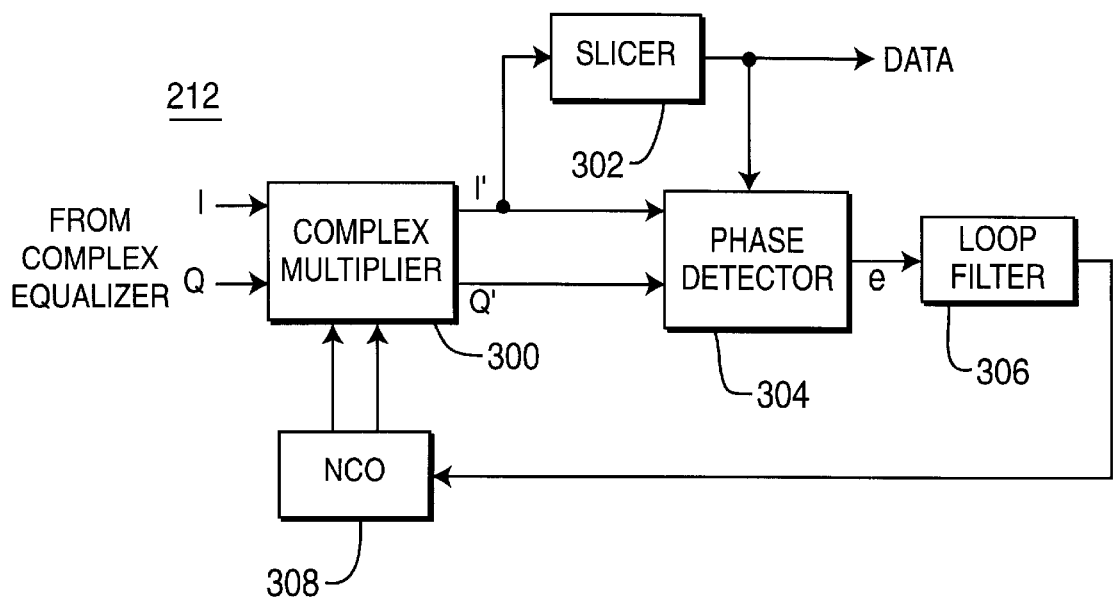
FIG. 3 depicts a phase tracking loop incorporating the decision directed phase detector of the present invention.

FIG. 3 depicts a block diagram of a phase tracking loop 212 that incorporates the present invention. The loop 212 contains a complex multiplier 300, a data slicer 302, a phase detector 304, a loop filter 306, and a numerically controlled oscillator (NCO) 308. The input to the complex multiplier 300 are the I and Q signals that have been extracted from a VSB signal and equalized. The output of the NCO 308 is coupled to one pair of inputs of the complex multiplier 300 such that multiplying the NCO output signals with the I and Q signals should, if the loop is operating properly, derotate the I and Q signals, remove any phase jitter and produce a stable I signal that can be sampled (sliced) at an optimal location to provide the greatest magnitude I signal (i.e., the sample accurately represents the transmitted symbol level).

The output of the complex multiplier in-phase (I') signal is coupled to the input of the slicer (quantizer) 302 that samples the I' signal on a periodic basis. The sampling rate is substantially the same as the symbol rate. The output of the slicer 302 is the data signal D that represent magnitude samples of the I' signal. In 8-VSB, there are eight different levels or symbol values generated by the slicer 302. The quantized I' signal (the data signal D) is coupled to one input of the phase detector 304 and the I' and Q' signals are coupled to the other two inputs of the phase detector 304. As such, the phase detector 304 operates in a decision directed mode such that the data decisions made by the slicer 302 are used to accurately generate a phase error (e). The phase error is coupled through the loop filter 306 that low pass filters the error signal to produce a control signal for the NCO 308. As such, the phase of the NCO is adjusted in response to the phase error produced by the phase detector 304 such that the output signals from the NCO compensate for the phase error of the VSB signal.

Figure 4:
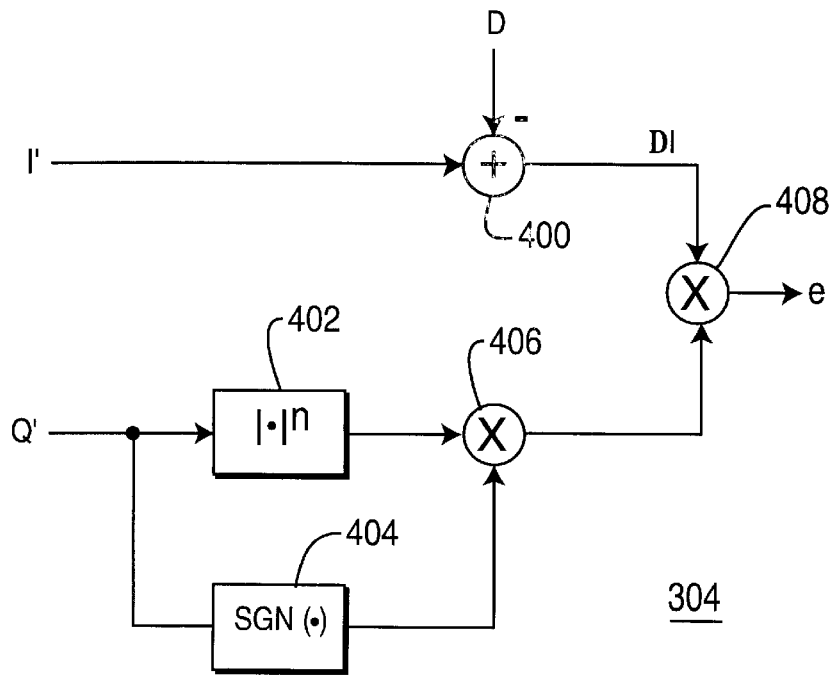
FIG. 4 depicts a detailed block diagram of the decision directed phase detector of the present invention To facilitate understanding, identical reference numerals have been used, where possible, to designate identical elements that are common to the figures.

FIG. 4 depicts the decision directed phase detector 304 of FIG. 3. In a VSB signal, the expected constellation contains I values that have discrete, known levels, e.g., eight levels. The Q values are variable such that the constellation appears as, for example, eight vertical lines when viewed on a Q value (vertical axis) versus I value (horizontal axis) graphical plot. Phase rotation of the VSB signal produces an angle between the received constellation and the expected constellation, e.g., the vertical lines are skewed at an angle corresponding to the phase angle. In the detector 304, this angle can be determined by estimating the arctangent of the offset of I' signal from the ideal quantized magnitude of the I' signal. The arctangent estimate is computed by the equation $\Delta I(sgn(Q')|Q'|^n)$. The circuitry of FIG. 4 computes this arctangent estimate as described below.

Specifically, the I' signal is coupled to a summer 400 and the decision signal D is coupled to the minus terminal of the summer 400 (operating as a subtractor) such that the quantized I' signal is subtracted from the unquantized I' signal to produce a $\Delta I$ signal. The Q' signal is coupled to both a magnitude processing block 402 that generates a magnitude representative signal ($|\bullet|^n$, where n is an integer value greater than or equal to 0) and a sign processing block 404 that produces a sign representative signal (e.g., sgn(•)). The magnitude and sign values derived from the Q' signal are multiplied with one another in the first multiplier 406. The output of the first multiplier (i.e., $(sgn(Q')|Q'|^n)$ is coupled to a second multiplier 408 to multiply that signal with the $\Delta I$ signal to produce the phase error (e). In this manner, the phase error (e) is generated using a decision directed process.

The circuit of FIG. 4 assumes that there is zero delay through the slicer 302. In the event of a delay, the I' and Q' inputs would have to be delayed to compensate for the slicer delay.

A mathematical representation of the phase detector 304 that produces the phase error e is following expression:

$$e=(I'-D)(sgn(Q')|Q'|^n$$

The expression (I'–D) is the quantization error of the output of the slicer 302, i.e., the $\Delta I$ signal. The parameter n in the expression is a design parameter that can be altered to modify the performance of the loop. The value n weighs the importance of the Q' output for controlling the phase of the signal and is typically 0, 1 or 2. Negative values of n can also be used but are more difficult to implement in hardware. Increasingly positive values of n bias the loop to use phase estimates generated from samples having large Q' magnitudes. Increasingly negative values of n force the loop to respond to n and bias the loop to use phase estimates generated from samples having small Q' magnitudes. The value n=0 causes the loop to ignore the magnitude of the Q' signal for computing phase estimates.

Although various embodiments which incorporate the teachings of the present invention have been shown and described in detail herein, those skilled in the art can readily devise many other varied embodiments that still incorporate these teachings.

What is claimed is:

1. A decision directed phase detector for detecting the phase error of a vestigial sideband (VSB) signal comprising:
    a subtractor having a first input coupled to an in-phase (I) signal and a second input coupled to a quantized I signal wherein the quantized I signal is subtracted from the I signal to produce a $\Delta I$ signal;
    a quadrature signal magnitude processing block having a quadrature phase (Q) signal as an input and having an output coupled to a first terminal of a first multiplier;
    a quadrature signal sign processing block having said quadrature phase (Q) signal as an input and having an output coupled to a second terminal of the first multiplier, the output of the first multiplier being coupled to a second multiplier to multiply with the $\Delta I$ signal to produce an error signal that represents a phase error of the VSB signal.

2. The decision directed phase detector of claim 1 wherein the quadrature signal magnitude processing block produces an n-th power absolute value of the Q signal, where n is an integer value.

3. The decision directed phase detector of claim 1 wherein said quadrature signal angle processing block produces the sign value of the Q signal.

4. A digital television receiver for demodulating a vestigial sideband (VSB) signal comprising:

a tuner for selecting a VSB signal from a plurality of VSB channels;

an analog-to-digital converter for digitizing the selected VSB signal at a sample rate established by an oscillator;

a complex Nyquist filter for extracting an in-phase (I) signal and a quadrature phase (Q) signal from the digitized VSB signal;

a complex equalizer for equalizing said I and Q signals;

a carrier recovery circuit for extracting I-data from the I signal;

wherein said carrier recovery circuit further comprises a phase tracking loop having a decision directed phase detector that uses both the I and Q signals for determining a phase error of the VSB signal.

5. The digital television receiver of claim 4 wherein said phase tracking loop comprises:

a complex multiplier for multiplying a phase adjusted oscillator signal with the I and Q signals to produce phase adjusted I and Q signals;

a slicer for quantizing the phase adjusted I signal to produce the I-data signal;

a decision directed phase detector for determining the phase error of the VSB signal using the I-data signal; and a loop filter for filtering the phase error to produce the phase adjusted oscillator signal.

6. The digital television receiver of claim 5 wherein said decision directed phase detector comprises:

a subtractor having a first input coupled to the I signal and a second input coupled to I-data signal wherein the I-data signal is subtracted from the I signal to produce a $\Delta$I signal;

a quadrature signal magnitude processing block having the Q signal as an input and having an output coupled to a first terminal of a first multiplier;

a quadrature signal sign processing block having the Q signal as an input and having an output coupled to a second terminal of the first multiplier, the output of the first multiplier being coupled to a second multiplier to multiply with the $\Delta$I signal to produce an error signal that represents a phase error of the VSB signal.

7. The digital television receiver of claim 6 wherein said decision directed phase detector wherein the quadrature signal magnitude processing block produces an n-th power absolute value of the Q signal, where n is an integer value.

8. The digital television receiver of claim 6 wherein said quadrature signal angle processing block produces the sign value of the Q signal.

9. A method of determining a phase error of a vestigial sideband (VSB) signal having an in-phase (I) signal and a quadrature phase (Q) signal comprising the steps of:

subtracting a quantized I signal from the I signal to produce a $\Delta$I signal;

magnitude processing the Q signal to produce a magnitude value for the Q signal;

sign processing the Q signal to produce a sign value for the Q signal;

multiplying the magnitude value and the sign value to produce a first multiplied signal;

multiplying the first multiplied signal with the $\Delta$I signal to produce an error signal that represents a phase error of the VSB signal.

10. The method of claim 9 wherein the magnitude processing step produces an n-th power absolute value of the Q signal, where n is an integer value.

11. The method of claim 9 wherein said sign processing step produces the sign value of the Q signal.

\* \* \* \* \*